United States Patent [19]

Shimomura et al.

[11] Patent Number: 5,001,329
[45] Date of Patent: Mar. 19, 1991

[54] ELECTRIC COOKING APPLIANCE

[75] Inventors: Nobuo Shimomura; Gen-ichiroh Kohno, both of Nagoya, Japan

[73] Assignee: Kabushiki Kaisha Toshiba, Kanagawa, Japan

[21] Appl. No.: 433,017

[22] Filed: Nov. 7, 1989

[30] Foreign Application Priority Data

Jan. 26, 1989 [JP] Japan ................................. 1-16630
Jan. 26, 1989 [JP] Japan ................................. 1-16631
Jan. 27, 1989 [JP] Japan ................................. 1-18208

[51] Int. Cl.$^5$ .............................................. H05B 3/74
[52] U.S. Cl. ................................. 219/464; 219/448
[58] Field of Search ............... 219/448, 449, 464, 465, 219/461

[56] References Cited

FOREIGN PATENT DOCUMENTS

| | | | |
|---|---|---|---|
| 0233375 | 8/1987 | European Pat. Off. ............ | 219/448 |
| 1274260 | 8/1968 | Fed. Rep. of Germany ...... | 219/448 |
| 2731782 | 1/1979 | Fed. Rep. of Germany ...... | 219/448 |
| 63-304589 | 12/1988 | Japan .................................... | 219/448 |
| 1406028 | 9/1975 | United Kingdom ................. | 219/461 |

Primary Examiner—Teresa J. Walberg
Attorney, Agent, or Firm—Philip M. Shaw, Jr.

[57] ABSTRACT

An electric cooking appliance includes a plurality of heater lamps supported by a frame having an opening so that light is radiated from the heater lamps through the opening toward a light-transmissible top plate disposed so as to cover the opening of the frame, and a protector for protecting the heater lamps against excessive increase of the ambient temperature of the heater lamps. The protector includes a temperature sensor for sensing the ambient temperature of the heater lamps or the temperature of a portion of the electric cooking appliance depending on the ambinet temperature of the heater lamps, the temperature sensor generating a state detection signal when the sensed temperature reaches a predetermined value, and an output controller for controlling output of the heater lamps so that a set output of the heater lamps is reduced in response to the state detection signal supplied thereto from the temperature sensor, with the result that the heating for the cooking is continued under the condition that the calorific power of the heater lamps is maintained at a small value.

9 Claims, 12 Drawing Sheets

ELECTRIC COOKING APPLIANCE

BACKGROUND OF THE INVENTION

The present invention relates to an electric cooking appliance employing heater lamps such as halogen lamps for heating a cooking pan containing foodstuff, and more particularly to such an electric cooking appliance provided with a protective device for protecting the heater lamps against excessive increase of the ambient temperature thereof.

Halogen lamps are generally employed as heater lamps in electric cookers of the type described above which have recently been tried to be made practicable, and heat generated by the halogen lamps is applied to a cooking pan to thereby cook foodstuff contained therein. The halogen heater lamp is superior to a nichrome wire heater in an amount of far infrared radiation to be generated and in that the temperature of the halogen lamp is rapidly raised since the heat capacity of the halogen lamp is small. The electric cooking appliance generally comprises a heating unit including several groups of halogen lamps, each group being made up of a plurality of halogen lamps, and a heat insulator covering the peripheral and bottom sides of the halogen lamps, and a top plate formed from heat-proof glass having a heat transmission property and covering the top surface of the heat insulator, thereby providing for the construction of small heat loss. In use, a cooking pan or the like containing foodstuff is placed on the top plate and the heat generated by the halogen lamps is applied to the cooking pan so that the foodstuff contained therein is cooked.

In the above-described electric cooking appliance, heat generated by the halogen lamps is radiated or transmitted through the top plate to the cooking pan and accordingly the heated object. The heat capacity of the top plate is rendered relatively large and accordingly, the temperature of the pan is not raised rapidly at an initial stage of the heating. The rise characteristic of the cooking pan temperature is lowered. Consequently, the halogen lamps of the high output type (usually 2 kW) have been conventionally employed as the heater lamps.

While, in the electric cooking appliance, the heat insulator and top plate are closely disposed for the purpose of enhancing the heating efficiency such that the interior of the heating unit is rendered a sealed space. For this reason, when the halogen lamps are continuously energized with the output thereof maintained at a high level, the ambient temperature of the halogen lamps or the atmospheric temperature in the heating unit is gradually increased to exceed the heat proof limit temperature (about 850° C.) of a quartz glass tube constituting the bulbs of the halogen lamps or the heat proof limit temperature (about 350° C.) of molybdenum used as material for closing ends of the quartz glass tubes. Continuous use of the halogen lamps at these heat-proof limit temperatures or above quickens turbidity of the quartz glass tubes and oxidation of molybdenum, respectively, thereby shortening the life of each halogen lamp.

Figure 13:
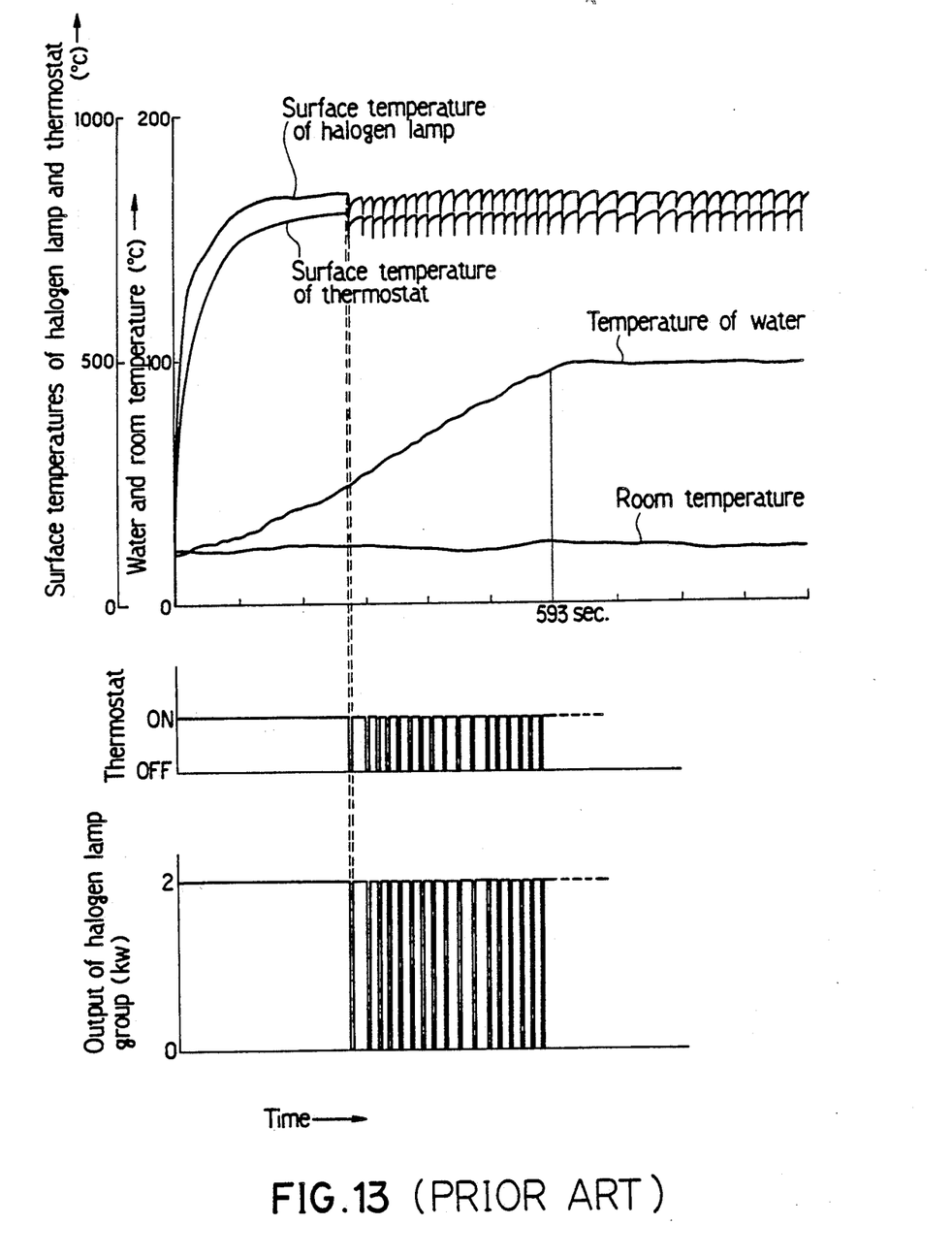
FIGS. 13 and 14 are views similar to FIG. 6 showing the cases of different loads in the use of a conventional electric cooking appliance, respectively.
Figure 14:
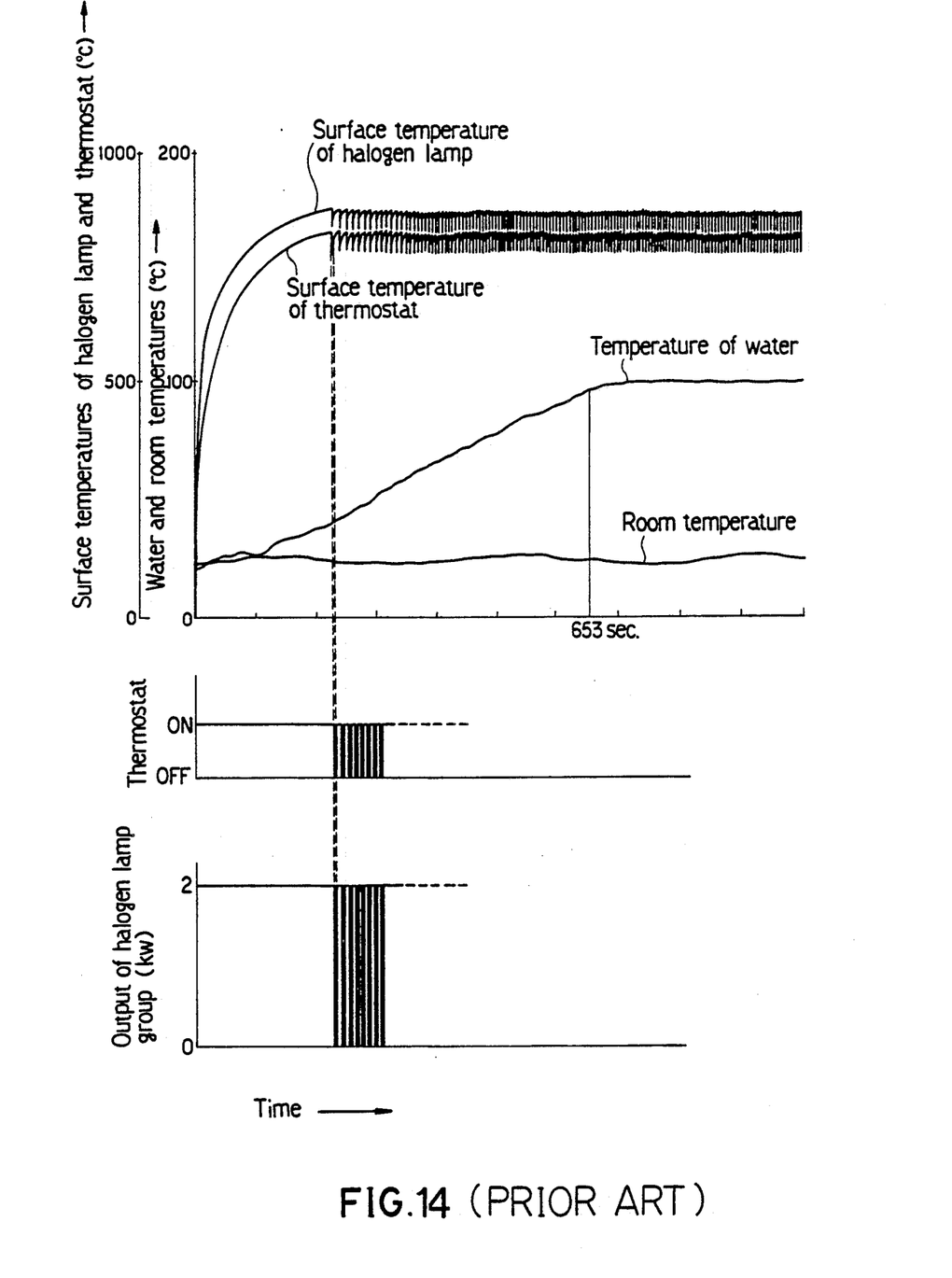

In order to solve the above-described problem, the conventional electric cooking appliance is provided with a thermostat as temperature sensing means for sensing the temperature of the interior of the heating unit. When the temperature of the heating unit interior is increased to a value predetermined for protection of the halogen lamps, the thermostat operates to deenergize the halogen lamps. According to this construction, however, when the halogen lamps are re-energized, the temperature of the heating unit interior is immediately raised again with the result that the halogen lamps are deenergized again. Energization and deenergization of the halogen lamps are reiterated at short intervals. Consequently, a problem arises that the lives of the halogen lamps are rendered short. More specifically, since the radiation heat is reflected in the case of a cooking pan of low heat absorptivity such as one with high light reflecting property, heat is liable to remain in the heating unit owing to reflection of heat on the cooking pan. Accordingly, upon energization of the halogen lamps, the heating unit interior temperature is immediately increased to the value at which the thermostat operates to deenergize the halogen lamps and consequently, the halogen lamps are reiteratively energized and deenergized. See FIG. 14. Additionally, even in the case of a cooking pan having dark bottom and therefore high heat absorptivity, the halogen lamps are reiteratively energized and deenergized at short intervals not so much in the cooking pan having low heat absorptivity, as is shown in FIG. 13. FIGS. 13 and 14 each show the relationship between on-off operations of the thermostat and the changes of the surface temperature of an outer tube (which will be described later) of a thermostat heat-sensitive portion and the bulb surface temperature of the halogen lamp.

SUMMARY OF THE INVENTION

Therefore, a primary object of the present invention is to provide an electric cooking appliance wherein the heater lamps can be protected against abnormal heating.

A second object of the invention is to provide an electric cooking appliance wherein a protective device for protecting heater lamps against excessive heating also prevents the halogen lamps from being reiteratively energized and deenergized at short intervals, thereby improving the life of each heater lamp.

In order to achieve these objects, the present invention provides for an electric cooking appliance wherein a plurality of heater lamps are supported by a frame having an opening so that light is radiated from the heater lamps through the opening toward a light-transmissible top plate disposed so as to cover the opening of the frame, characterized by a protecting device comprising temperature sensing means for sensing the ambient temperature of the heater lamps or the temperature of a portion of the electric cooking appliance depending on the ambient temperature of the heater lamps, said temperature sensing means generating a state detection signal when the sensed temperature reaches a predetermined value, and output control means for controlling output of the heater lamps so that the set output of the heater lamps is reduced in response to the state detection signal supplied thereto from the temperature sensing means, whereby the heating for the cooking is continued under the condition that the calorific power of the heater lamps is maintained at a small value.

When the ambient temperature of the heater lamps is increased to the predetermined value or above after the start of the heating by the heater lamps, the temperature sensing means senses the ambient temperature of the heater lamps to thereby generate the state detection signal. In response to the state detection signal, the output control means operates to switch the output of the heater lamps to a predetermined smaller value and to continue the heating under the condition that the output of each heater lamp is switched to the lower value. Consequently, the temperature of each heater lamp may be prevented from being excessively increased. Additionally, since the output of the heater lamps is switched to the small value, the calorific power of the heater lamps is reduced thereafter, which renders increase of the ambient temperature of the heater lamps sluggish. Consequently, the heater lamps can be prevented from being reiteratively energized and deenergized at short intervals and the heater lamp current may be prevented from being varied at short intervals, thereby preventing the life of each heater lamp from being shortened.

The output control means may comprise a switching element turned on and off so that the heater lamps are connected to and disconnected from a power line. The switching element is turned on when the temperature sensed by the temperature sensing means reaches the predetermined value, and thereafter, the switching element is turned off when the temperature sensed by the temperature sensing means reaches a value corresponding to a predetermined differential with respect to the predetermined value.

Electrical power supplied to the heater lamps during an OFF period of an ON-OFF operation of the switching element may take a value smaller than that during an ON period.

The output control means may be responsive to an initial state detection signal generated by the temperature sensing means after a predetermined period from the start of the heating operation of the heater lamps. Alternatively, the output control means may be responsive to an initial state detection signal generated by the temperature sensing means after the start of the heating operation of the heater lamps.

The invention may also be practiced by an electric cooking appliance wherein a plurality of heater lamps are supported by a frame having an opening so that light is radiated from the heater lamps through the opening toward a light-transmissible top plate disposed so as to cover the opening of the frame, characterized by a protective device comprising temperature sensing means for sensing the ambient temperature of the heater lamps or the temperature of a portion of the electric cooking appliance depending on the ambient temperature of the heater lamps, said temperature sensing means generating a state detection signal when the sensed temperature reaches a predetermined value, and output control means for controlling output of the heater lamps so that the set output of the heater lamps is reduced every time when the state detection signal generated by the temperature sensing means is supplied thereto, whereby the heating for the cooking is continued under the condition that the calorific power of the heater lamps is lowered stepwise.

Since the set output of the heater lamps is lowered stepwise every time when the temperature sensed by the temperature sensing means reaches the predetermined value, the calorific power of the heater lamp is necessarily balanced with a calorific value consumed by a load such as a cooking pan lastly. Consequently, since the heating efficiency is not affected by differences of heat reflectance of cooking pan heated surfaces, the heating efficiency can be rendered stable.

The set output of the heater lamps may be lowered stepwise in a range above a predetermined lower limit output value. When water is added into the cooking pan being heated or when the cooking pan being heated is replaced by a new unheated cooking pan, a heating rise period can be shortened.

Other and further objects of the present invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

A first embodiment of the electric cooking appliance in accordance with the invention will now be described with reference to FIGS. 1 to 6 of the drawings.

Figure 1:
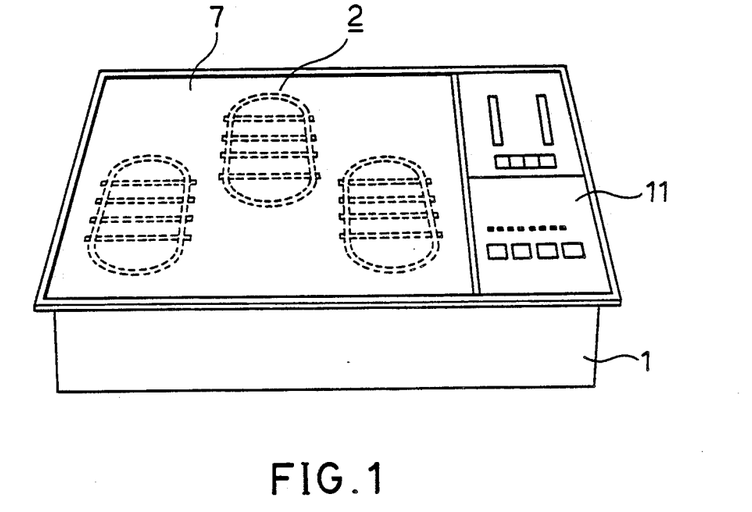
FIG. 1 is a perspective view of an electric cooking appliance of a first embodiment in accordance with the present invention.
Figure 2:
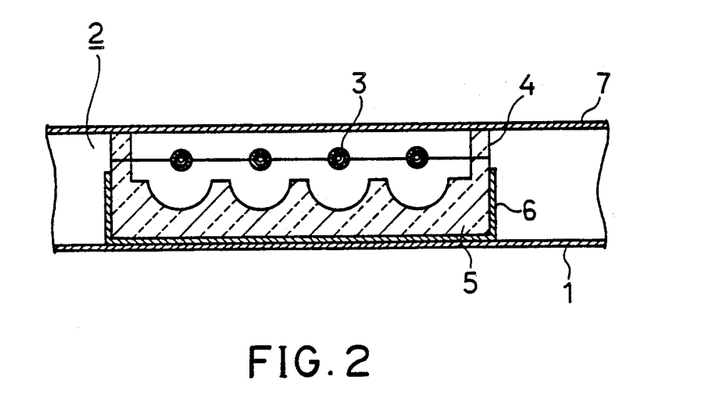
FIG. 2 is an enlarged longitudinal section of a heating unit of the electric cooking appliance.
Figure 3:
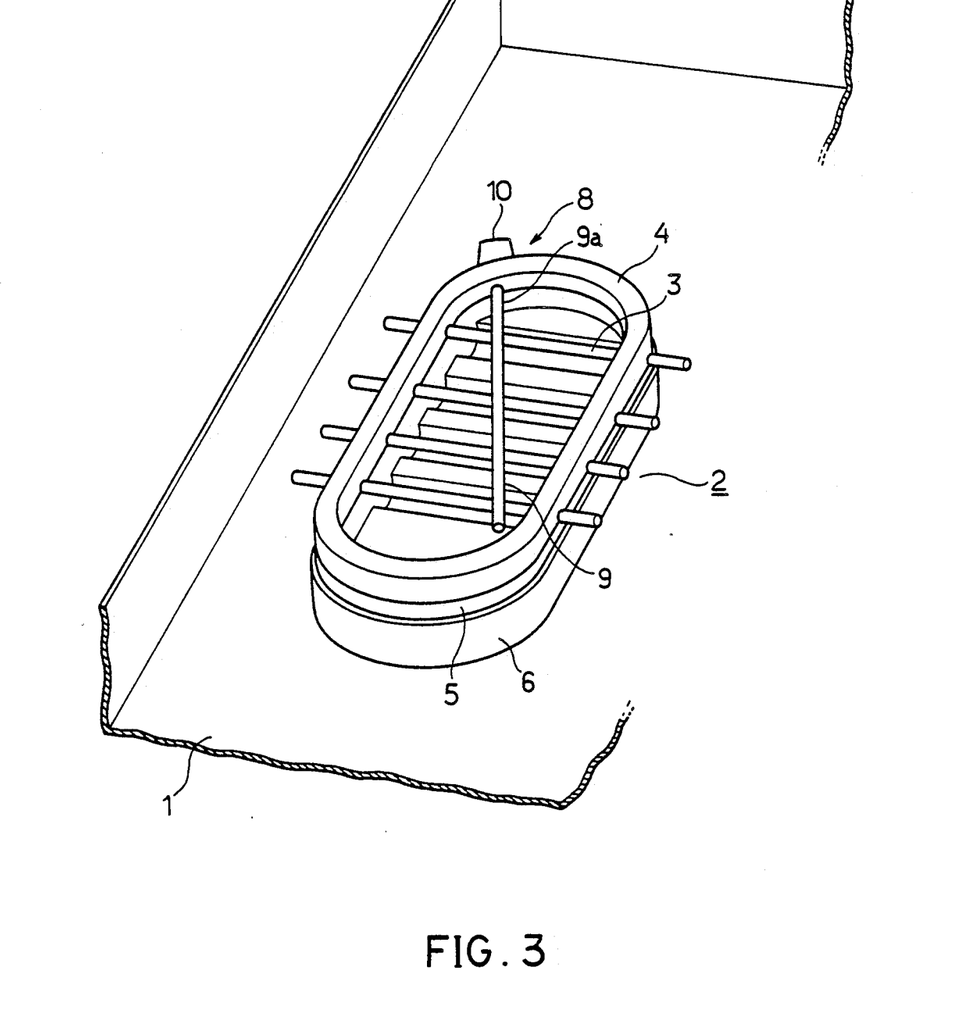
FIG. 3 is an enlarged perspective view of a portion of the electric cooking appliance including the heating unit.

Referring first to FIG. 1, an outer frame 1 of the electric cooking appliance is formed into a flat rectangular box shape. Three heating units 2 are provided in the outer frame 1, for example. Each heating unit 2 comprises a plurality of halogen lamps 3 serving as heater lamps and slenderly circular upper and lower heat-insulators 4 and 5 as a heating unit forming frame for supporting the halogen lamps 3, as shown in FIGS. 2 and 3. The bottomed lower heat-insulator 5 is received by a receptacle 6 secured to the inner bottom of the outer frame 1. Three halogen lamps 3 are employed in each heating unit 2 in the embodiment. An upper opening of the upper heat-insulator 4 of each heating unit 2 is covered with a heat-transmissible top plate 7 formed from heat-proof glass. The top plate 7 is close to the upper heat-insulator 4 so as to seal the heating unit 2. As a result, each heating unit 2 has a small heat loss.

Figure 4:
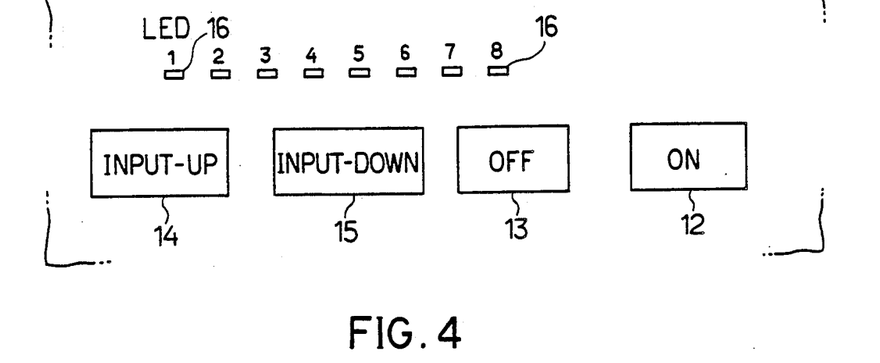
FIG. 4 is an enlarged front view of an operation panel of the electric cooking appliance.

A thermostat 8 serving as temperature sensing means is provided for sensing the atmospheric temperature in the heating unit 2 or the ambient temperature of the halogen lamps 3. As well known in the art, the thermostat 8 comprises a heat-sensitive section 9 including a metallic bar (not shown) disposed in a metallic outer tube 9a so as to expand and contract in response to the temperature change and a switch section 10 turned on and off by way of expansion and contraction of the metallic bar of the heat-sensitive section 9. The heat-sensitive section 9 is disposed so as to sense the ambient temperature of the halogen lamps 3. Alternatively, the heat-sensitive section 9 may be disposed so as to sense the temperature of a member of the electric cooking appliance depending on the ambient temperature of the halogen lamps 3. The switch section 10 is disposed outside the heating units 2. The thermostat 8 is designed so as to be turned off when the sensed temperature exceeds a predetermined value, for example, 700° C. An operation panel 11 is provided on the outer frame 1 so as to be planar to the top plate 7, as shown in FIG. 1. As shown in FIG. 4, the operation panel 11 includes an ON switch 12 for starting the heating operation, an OFF switch 13 for stopping the heating operation, INPUT-UP and INPUT-DOWN switches 14 and 15 for adjusting the calorific value of each halogen lamp 3 or input thereto, and a plurality of light-emitting diodes 16 for indicating the magnitude of the input to each halogen lamp 3. The above-described switches 12 to 15 and light-emitting diodes 16 are provided for each heating unit 2 and such switches and light-emitting diodes for one heating unit 2 are shown in the drawings for convenience' sake.

Figure 5:
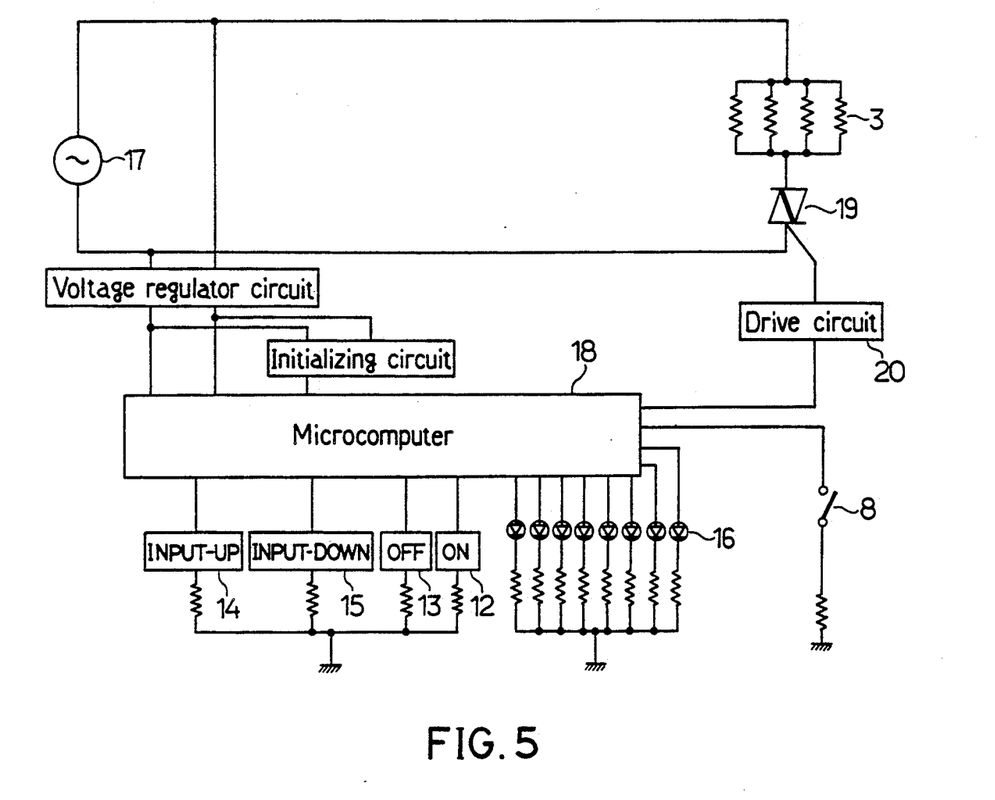
FIG. 5 is a circuit diagram showing an electrical arrangement of the electric cooking appliance.

FIG. 5 illustrates an electric circuit arrangement of the electric cooking appliance concerning one of the heating units 2. In the heating unit 2, four halogen lamps 3 are connected in parallel with a power source 17. The halogen lamps 3 are controlled by a microcomputer 18.

The microcomputer 18 is provided for controlling various electrical parts of the electric cooking appliance. The microcomputer 18 receives signals from the thermostat 8 and the switches 12-15 and activates or deactivates the light-emitting diodes 16 in accordance with the input signals. A triac 19 serves as a switching element connected in series to the group of halogen lamps 3 so that the group of halogen lamps 3 are connected to and disconnected from a power line. The microcomputer 18 controls the triac 19 via a drive circuit 20, thereby energizing and deenergizing the group of halogen lamps 3. More specifically, the microcomputer 18 controls the supply power by phase controlling the voltage applied to the halogen lamps 3 during the on-period of the thermostat 8, thereby controlling the output or calorific power of the group of the halogen lamps 3. In the phase control, the turn-on phase angle of the triac 19 is controlled in such a manner as well known in the art. The output of the group of halogen lamps 3 is set with INPUT-UP and INPUT-DOWN switches 14 and 15, and the output setting with these switches is executed by way of the above-mentioned phase control. In the case where the output of the group of halogen lamps 3 set with the switch 14 or 15 is above 1.6 kW, the microcomputer 18 is so programmed that the output of the group of halogen lamps 3 is reduced to the value of 1.6 kW after a predetermined time or when the thermostat 8 senses a predetermined temperature after start of the heating operation to thereby be turned off in the embodiment. This output reduction is executed in the manner that the set output value for controlling the group of halogen lamps 3 is automatically switched by halogen lamp output switching means in the microcomputer 18 so as to be a value smaller than the value set with the switch 14 or 15. Accordingly, the microcomputer 18 also functions as output control means for controlling the halogen lamp output. In the abovedescribed construction, the thermostat 8 and the halogen lamp output switching means in the microcomputer 18 constitute abnormal heating preventing means.

Figure 6:
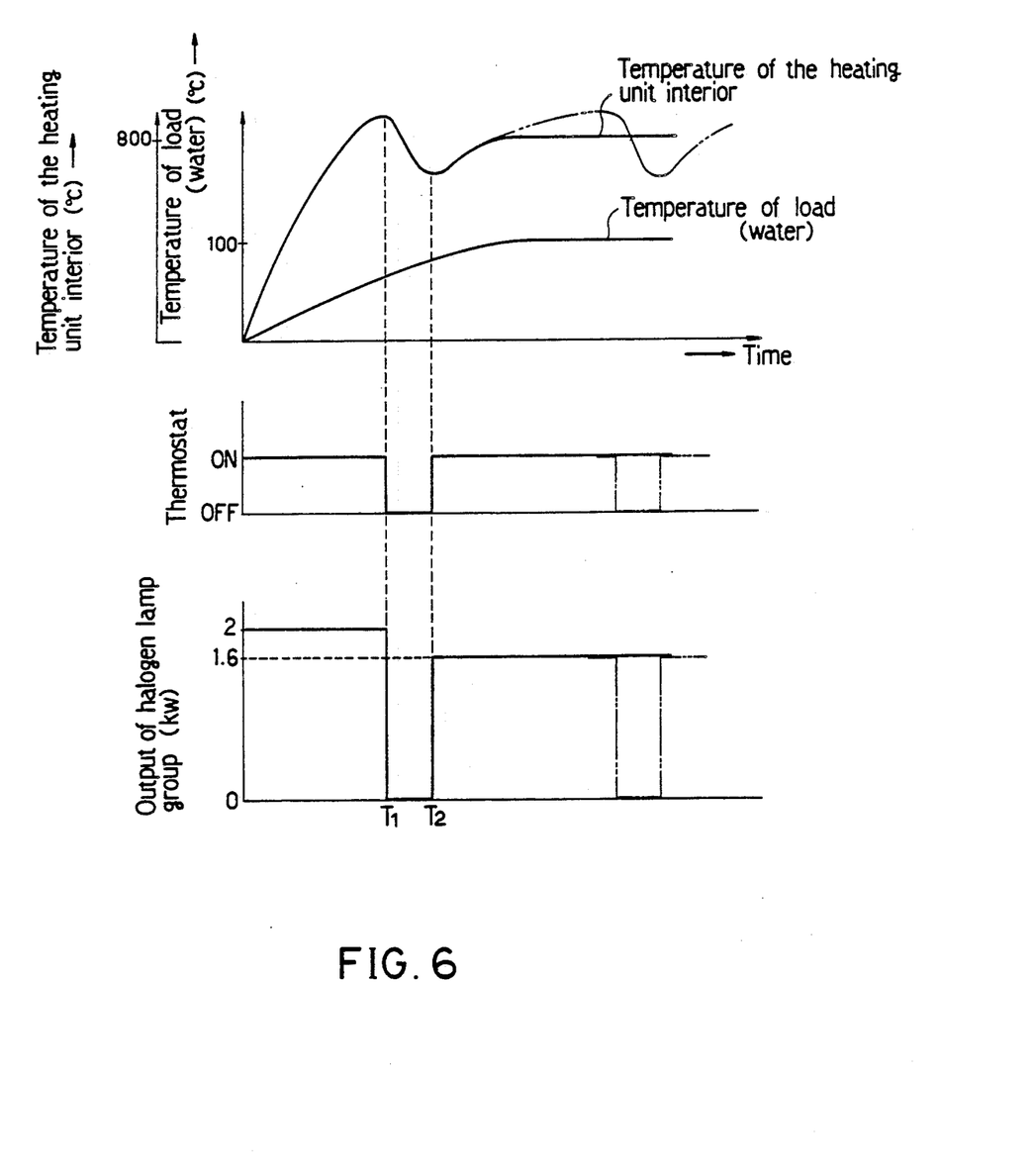
FIG. 6 is a time chart explaining interrelationship among the temperature of the heating unit, operation of a thermostat and the output of each halogen lamp in the electric cooking appliance of the first embodiment.

Operation of the above-described electric cooking appliance will now be described with reference to the time chart of FIG. 6. The following description of operation will help to understand the control of halogen lamp calorific power by means of the microcomputer 18.

First, the ON switch 12 is operated so that the cooking is initiated, and then, the INPUT-UP switch 14 or INPUT-DOWN switch 15 is operated so that the output (heating intensity) of the group of halogen lamps 3 is set. The microcomputer 18 controls the electrical power supplied to the group of halogen lamps 3 by phase controlling the triac 19, whereby the group of halogen lamps 3 are caused to emit heat or light at a set output.

Suppose now that the output of halogen lamp group is set at the maximum output of 2 kW with the INPUT-UP switch 14 depending on the foodstuff to be cooked. Heat generated by the group of halogen lamps 3 is directly radiated to the cooking receptacle such as a pan containing load such as water and transmitted to the same through the top plate 7, whereby the cooking receptacle is heated and the temperature of the interior of the heating unit 2 is rapidly increased. When the temperature of the heating unit interior reaches a predetermined value or above, the thermostat 8 is turned off (at time T1 in FIG. 6). Upon turn-off of the thermostat 8, the microcomputer 18 operates to turn off the triac 19 in response to an OFF state detection signal from the thermostat 8, thereby deenergizing the group of halogen lamps 3. Simultaneously with turn-off of the triac 19, the microcomputer 18 operates to switch the halogen lamp set output to a smaller value or 1.6 kW. When deenergization of the group of halogen lamps 3 lowers the temperature of the heating unit interior to the lower limit value of a predetermined differential, the thermostat 8 is turned on (at time T2 in FIG. 6). Upon receipt of an ON signal from the thermostat 8, the microcomputer 18 operates to reenergize the group of halogen lamps 3 and control the electrical power supplied thereto so that the output thereof takes the value of 1.6 kW. Although the temperature of the heating unit interior is increased again, the temperature increasing rate is rendered relatively slow since the calorific power of the group of halogen lamps 3 is reduced so as to approximate the calorific value of heat given off out of the heating unit 2. Furthermore, the temperature of the heating unit interior is not thereafter increased too much and remain unchanged at the predetermined value. Accordingly, the temperature of the heating unit interior is not increased to the value at which the thermostat 8 is turned off, or even when the temperature of the heating unit interior is increased to the thermostat turn-off value, a period necessary to reach the thermostat turn-off value is rendered longer. The solid line in FIG. 6 shows the case where the calorific power of the group of halogen lamps 3 keeps the approximate balance with the calorific value of heat given off out of the heating unit 2 as the result that the output of the group of halogen lamps 3 is reduced to 1.6 kW. When the calorific power of the group of halogen lamps 3 is larger than the calorific value of heat given off out of the heating unit 2, the group of halogen lamps 3 are reiteratively energized and deenergized with the output set at 1.6 kW, though at long intervals, as shown by alternate long and two short dashes line in FIG. 6. After heat is applied to the cooking receptacle for a suitable period, the OFF switch 13 is operated to thereby complete the cooking.

As the result of the above-described control manner of the microcomputer 18, the number of on-off operations of the thermostat 8 is reduced and accordingly, the number of reiterative energized and deenergized states of the group of halogen lamps 3 is reduced, thereby improving the lives of the halogen lamps 3. Furthermore, since the temperature of the heating unit interior is controlled by the thermostat 8 so as not to exceed the heat-proof limitation of the halogen lamps 3, the lives of the halogen lamps 3 are prevented from being shortened owing to the heating.

Although the output of the group of halogen lamps 3 is reduced after the initial turn-off operation of the thermostat 8 in the foregoing embodiment, the output reduction may take place after elapse of a predetermined period, five minutes for example, from the turn-off operation of the thermostat 8 at any number of times after the initial turn-off operation thereof or from the time when the initial heating operation starts.

A second embodiment of the invention will now be described. The second embodiment differs from the foregoing embodiment in the contents of a control program applied to the microcomputer 18. More specifically, every time when the thermostat 8 senses the predetermined temperature of the heating unit interior or above to thereby turn off, the microcomputer 18 operates to reduce the set output of the group of halogen lamps 3 at a predetermined percentage of the maximum output (2 kW), for example, at 5% (0.1 kW), in the subsequent on-period, after a predetermined time or after start of the cooking, for example.

Figure 7:
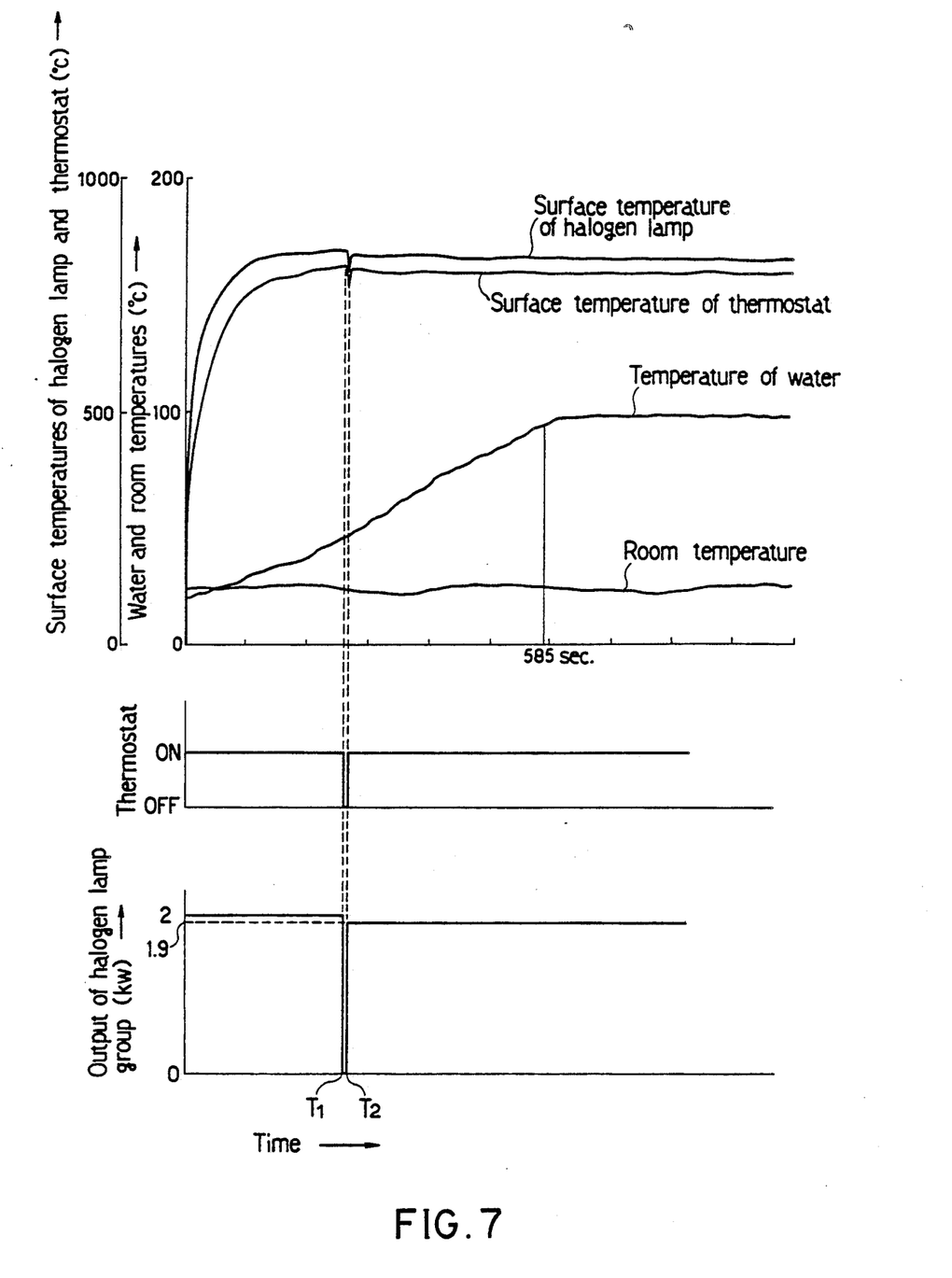
FIG. 7 is a view similar to FIG. 6 showing the case of the electric cooking appliance of a second embodiment.
Figure 8:
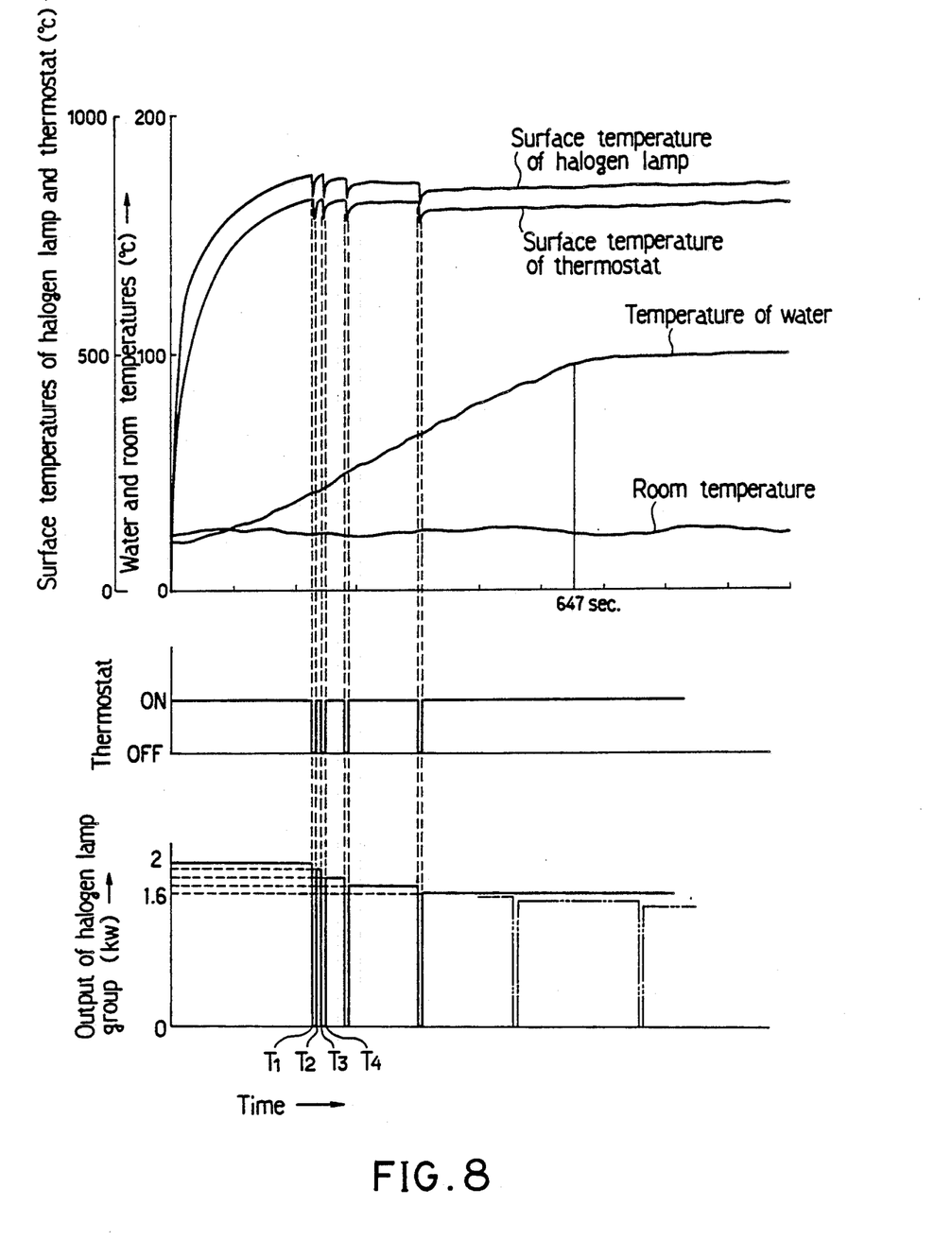
FIG. 8 is a view similar to FIG. 7 showing the case of a different load.

Operation of the electric cooking appliance of the second embodiment will be described with reference to FIGS. 7 and 8. The time charts of FIGS. 7 and 8 are based on the results of an experiment wherein each of high and low heat absorptivity pans contain 2 litters of water as load. In FIGS. 7 and 8, the thermostat surface temperature refers to the temperature of the outer tube 9a of the heat sensitive section 9.

Referring first to FIG. 7 showing the case of the high heat absorptivity pan, the ON switch 12 is operated so that the heating is initiated, and the INPUT-UP switch 14 or INPUT-DOWN switch 15 is operated so that the output of the group of the halogen lamps 3 is set at the maximum value (2 kW). Heat generated by the group of halogen lamps 3 is directly radiated to the pan and transmitted to the same through the top plate 7, whereby the pan is heated and the temperature of the interior of the heating unit 2 is rapidly increased. When the temperature of the heating unit interior reaches a predetermined value or above, the thermostat 8 is turned off (at time T1 in FIG. 7). Upon turn-off of the thermostat 8, the microcomputer 18 operates to turn off the triac 19 in response to an OFF state detection signal from the thermostat 8, thereby deenergizing the group of halogen lamps 3. When deenergization of the group of halogen lamps 3 causes the heating unit interior temperature to be reduced to a predetermined value, the thermostat 8 is turned on (at time T2 in FIG. 7). Upon receipt of the ON state detection signal from the thermostat 8, the microcomputer 18 operates to energize the group of halogen lamps 3. In the energization of the group of halogen lamps 3, the microcomputer 18 operates to reduce the previous set output by 0.1 kW by way of the phase control of the triac 19 so that the set output takes the value of 1.9 kW, whereby heat is generated by the group of halogen lamps 3 with the output thereof reduced from 2 kW to 1.9 kW. Although re-energization of the group of halogen lamps 3 causes the heating unit interior temperature to be increased again, the calorific power of the group of halogen lamps 3 is caused to approximate the calorific value of heat absorbed by the pan in the example of FIG. 7 since the halogen lamp set output is reduced by one step. Accordingly, the temperature of the heating unit interior is not thereafter increased to the thermostat turn-off temperature, and the group of halogen lamps 3 are continuously energized with the output thereof maintained at the value of 1.9 kW. The OFF switch 13 is operated after a suitable period of heating, thereby completing the cooking.

Referring now to FIG. 8 illustrating the case of a low heat absorptivity pan, suppose that the cooking is initiated with the output of the group of halogen lamps 3 set at 2 kW in the same manner as described above. The pan placed on the top plate 7 is heated, and the temperature of the heating unit interior is rapidly increased. The thermostat 8 is turned off when the temperature of the heating unit interior reaches the predetermined temperature, thereby deenergizing the group of halogen lamps 3 (at time T1 in FIG. 8). The set output of the group of halogen lamps 3 is changed to the value of 1.9 kW obtained by reducing the previous set output by 0.1 kW. When this reduction of the set output causes the heating unit interior temperature to be decreased to a predetermined value, the thermostat 8 is turned on with the result that the halogen lamps 3 are energized (at time T2 in FIG. 8). However, since the pan in the example in FIG. 8 has low heat absorptivity, the calorific power of the group of halogen lamps 3 is larger than the calorific value of heat absorbed by the pan and the like even when the set output of the halogen lamp group is reduced to the value of 1.9 kW. Accordingly, the temperature of the heating unit interior is again increased to the predetermined value at which the thermostat 8 is again turned off (at time T3 in FIG. 8), thereby deenergizing the halogen lamps 3. Then, the output of the halogen lamp group is set at 1.8 kW obtained by reducing the previous set output by 0.1 kW. This reduction of the set output causes the heating unit interior temperature to be decreased and the thermostat 8 is again turned on such that the halogen lamps 3 are energized (at time T4 in FIG. 8).

The set output of the halogen lamp group is reduced by 0.1 kW every time when the thermostat 8 is turned off. The output of the halogen lamp group eventually approximates the calorific value of heat absorbed by the pan and the like. In the example of FIG. 8, the calorific power of the halogen lamp group approximates the calorific value of heat absorbed by the pan and the like when the output of the halogen lamp group is reduced to the value of 1.6 kW. After the output of the halogen lamp group approximates the calorific value of heat absorbed by the pan and the like, the thermostat 8 is not turned off, whereby the halogen lamps 3 are continuously energized. Should the calorific power of the halogen lamp group exceed the calorific value of heat absorbed by the pan and the like, the set output of the halogen lamp group is reduced by 0.1 kW every time when the thermostat 8 is turned off, as shown by alternate long and two short dashes line in FIG. 8. According to the above-described second embodiment, the set output of the halogen lamp group is reduced stepwise every time when the thermostat 8 senses the predetermined temperature to be turned off, and eventually, the output or calorific power of the halogen lamp group is automatically adjusted so as to approximate the calorific value of heat absorbed by the pan and the like, with the result that the halogen lamps 3 are continuously energized. Furthermore, although the halogen lamps 3 are energized and deenergized with turn-on and turn-off of the thermostat 8 until the calorific power of the halogen lamp group approximates the calorific value of heat absorbed by the pan and the like, periods of energization and deenergization of the halogen lamp group are rendered longer as the output thereof approaches the calorific value of heat absorbed by the pan and the like. Additionally, the period of continuous energization of the halogen lamp group is rendered longer. Consequently, as obvious from the comparison of FIGS. 7 and 8 with FIGS. 13 and 14 showing the prior art, the heating period necessary to obtain hot water at temperature of 95° C. is 585 seconds in the use of a high heat absorptivity pan in the present invention while it is 593 seconds in the prior art. In the use of the low heat absorptivity pan, the heating period is 647 seconds in the present invention while it is 653 seconds in the prior art. The comparison shows that a favorable heating operation is performed in spite that the output of the halogen lamp group is reduced by 0.1 kW every time when the thermostat 8 is turned off.

Figure 9:
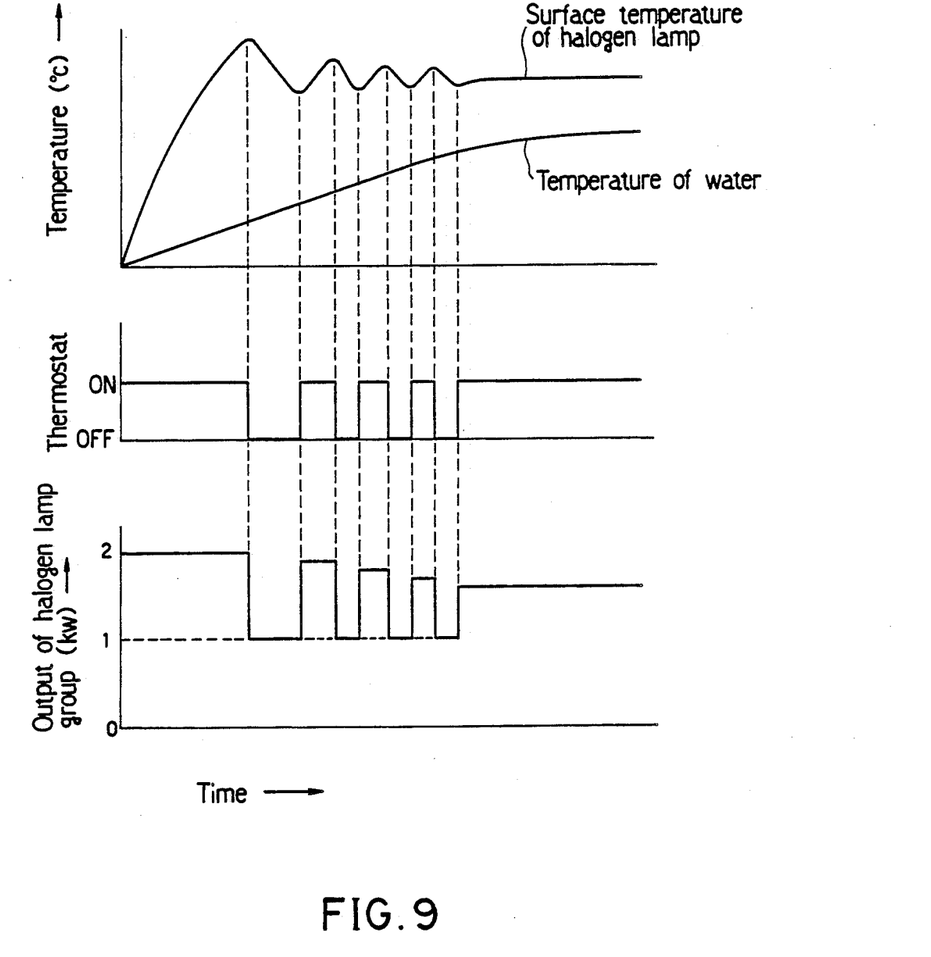
FIG. 9 is a view similar to FIG. 6 showing the case of a modified form of the second embodiment.

Although the halogen lamps 3 are deenergized during the turn-off period of the thermostat 8 in the above-described embodiment, the output of the halogen lamp group may be reduced to the value of 1 kW during the turn-off period of the thermostat 8 as shown in FIG. 9. In this modified form, the number of large fluctuations of current flowing through the halogen lamp group may be reduced, thereby improving the lives of the halogen lamps 3.

A third embodiment of the invention will now be described. The content of the control program applied to the microcomputer 18 in the third embodiment differs from that in the first embodiment. In the third embodiment, the microcomputer 18 operates so that when the ON switch 12 is operated, the halogen lamps 3 are continuously energized until the OFF switch 13 is operated. The output or calorific power of the halogen lamp group during the energization is controlled so as to take a high output (at the maximum output of 2 kW, for example) in the turn-on period of the thermostat 8 and to take a low output in the turn-off period of the thermostat 8 or to range from one third to two thirds of the maximum output (2 kW), 1 kW in the embodiment. The microcomputer 18 is so programmed that every time when the thermostat 8 is turned off after start of the heating, the output of the halogen lamp group is gradually reduced by 5% (0.1 kW) of the maximum output (2 kW) in the subsequent turn-on period of the thermostat 8. This gradual reduction of the output of the halogen lamp group is executed in the range above a predetermined value or 1.6 kW, for example. When the output of the halogen lamp group is reduced to the value of 1.6 kW, the set output of the halogen lamp group is maintained at 1.6 kW in the turn-on period of the thermostat 8 even when the same is thereafter turned off. The value of 1.6 kW is an example of a predetermined lower limit of the output necessary for the cooking.

Figure 10:
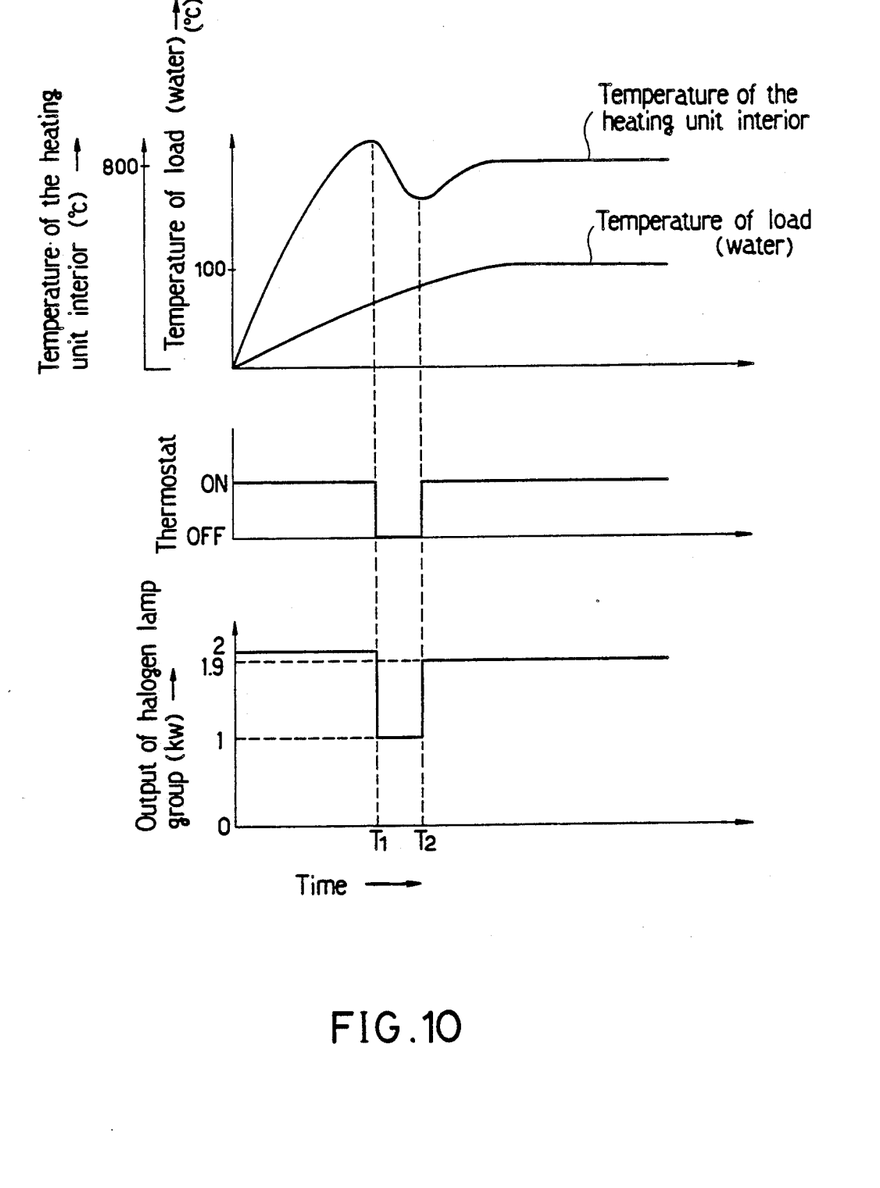
FIG. 10 is a view similar to FIG. 6 showing the case of the electric cooking appliance of a third embodiment.
Figure 11:
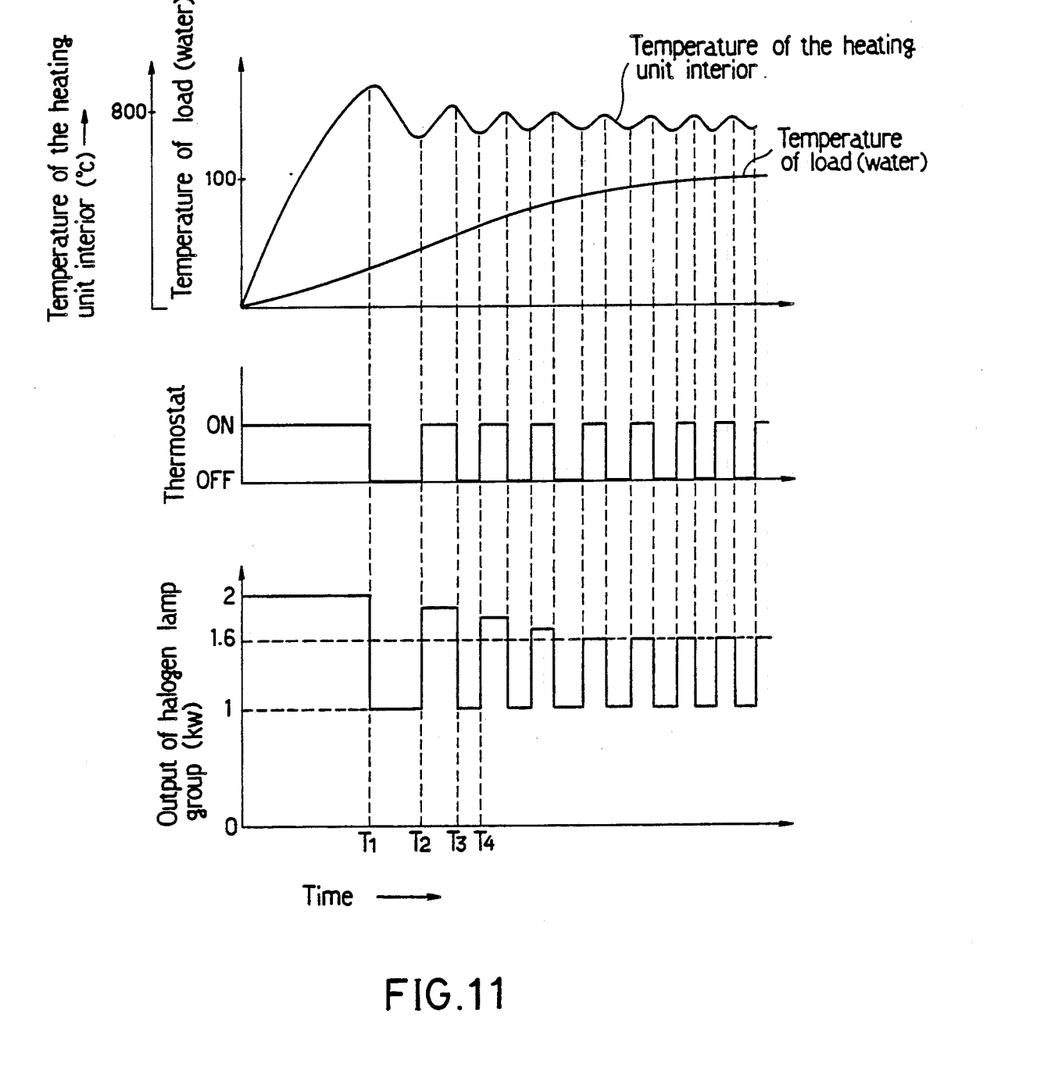
FIG. 11 is a view similar to FIG. 10 showing the case of a different load.

Operation of the electric cooking appliance of the third embodiment will be described with reference to FIGS. 10 and 11. FIGS. 10 and 11 show the cases where high and low heat absorptivity pans each containing water as load are heated, respectively.

Referring first to FIG. 10 showing the case of a high heat absorptivity pan, the ON switch 12 is operated so that the heating is initiated, and the INPUT-UP 14 or INPUT-DOWN switch 15 is operated so that the output of the halogen lamp group is set at the maximum value of 2 kW. Heat generated by the group of halogen lamps 3 is directly radiated to the pan and transmitted to the same through the top plate 7, whereby the pan is heated and the temperature of the interior of the heating unit 2 is rapidly increased. When the temperature of the heating unit interior reaches a predetermined value or above, the thermostat 8 is turned off (at time T1 in FIG. 10). Upon turn-off of the thermostat 8, the microcomputer 18 operates to reduce the output of the halogen lamp group in response to an OFF state detection signal from the thermostat 8. When the output reduction causes the heating unit interior temperature to be decreased to a predetermined value, the thermostat 8 is turned on (at time T2 in FIG. 10). In response to an ON state detection signal from the thermostat 8, the microcomputer 18 operates to increase the output of the halogen lamp group to the value larger than that in the turn-off period of the thermostat 8. More specifically, the microcomputer 18 operates to reduce the previously set output of the halogen lamp group by 0.1 kW by phase controlling the triac 19, whereby heat is generated by the halogen lamp group with the set output thereof reduced from 2 kW to 1.9 kW. Although the temperature of the heating unit interior is again increased, the calorific power of the halogen lamp group approximates the calorific value of heat absorbed by the pan in the example of FIG. 10 as the result of output reduction by one step. Consequently, the temperature of the heating unit interior is not thereafter increased to the value at which the thermostat 8 is turned off, and the halogen lamp group is continuously energized to maintain the output of 1.9 kW. The OFF switch 13 is operated after the pan is heated for a suitable period, thereby completing the cooking.

Referring now to FIG. 11 showing the case of the low heat absorptivity pan, the output of the halogen lamp group is set at the value of 2 kW in the same manner as described above, thereby initiating the cooking. Heat generated by the halogen lamp group is applied to the pan placed on the top plate 7 and the temperature of the heating unit interior is rapidly increased. When the heating unit interior temperature reaches a predetermined value, the thermostat 8 is turned off such that the set output of the halogen lamp group is largely reduced from 2 kW to 1 kW (at time T1 in FIG. 11). When the output reduction causes the heating unit interior temperature to be decreased to a predetermined value, the thermostat 8 is turned on and heat is generated by the halogen lamp group with the output of 1.9 kW obtained by reducing the previously set output by 0.1 kW (at time T2 in FIG. 11). However, since the heat absorptivity of the pan in the case of FIG. 11 is low, the calorific power of the halogen lamp group is larger than the calorific value of heat absorbed by the pan and the like even when the output of the halogen lamp group is reduced to the value of 1.9 kW. Accordingly, the heating unit interior temperature is again increased to the predetermined value, at which value the thermostat 8 is again turned off (at time T3 in FIG. 11). The output of the halogen lamp group is then reduced to the value of 1 kW. Since the temperature of the heating unit interior is decreased owing to the output reduction of the halogen lamp group, the thermostat 8 is again turned on, whereby the halogen lamp group is energized (at time T4 in FIG. 11) such that heat is generated therefrom with the output set at the value of 1.8 kW which is obtained by reducing the previous output of 1.9 kW by 0.1 kW.

The set output of the halogen lamp group is thus reduced by 0.1 kW every time when the thermostat 8 is turned off. The output reduction is continued until the output of the halogen lamp group takes the value of 1.6 kW. In the case where the output of the halogen lamp group is larger than the calorific value of heat absorbed by the pan and the like even when the halogen lamp output is reduced to the value of 1.6 kW, the thermostat 8 is thereafter turned on and off but the on-off cycles thereof are rendered longer than before since the halogen lamp output approaches the calorific value of heat absorbed by the pan and the like.

Figure 12:
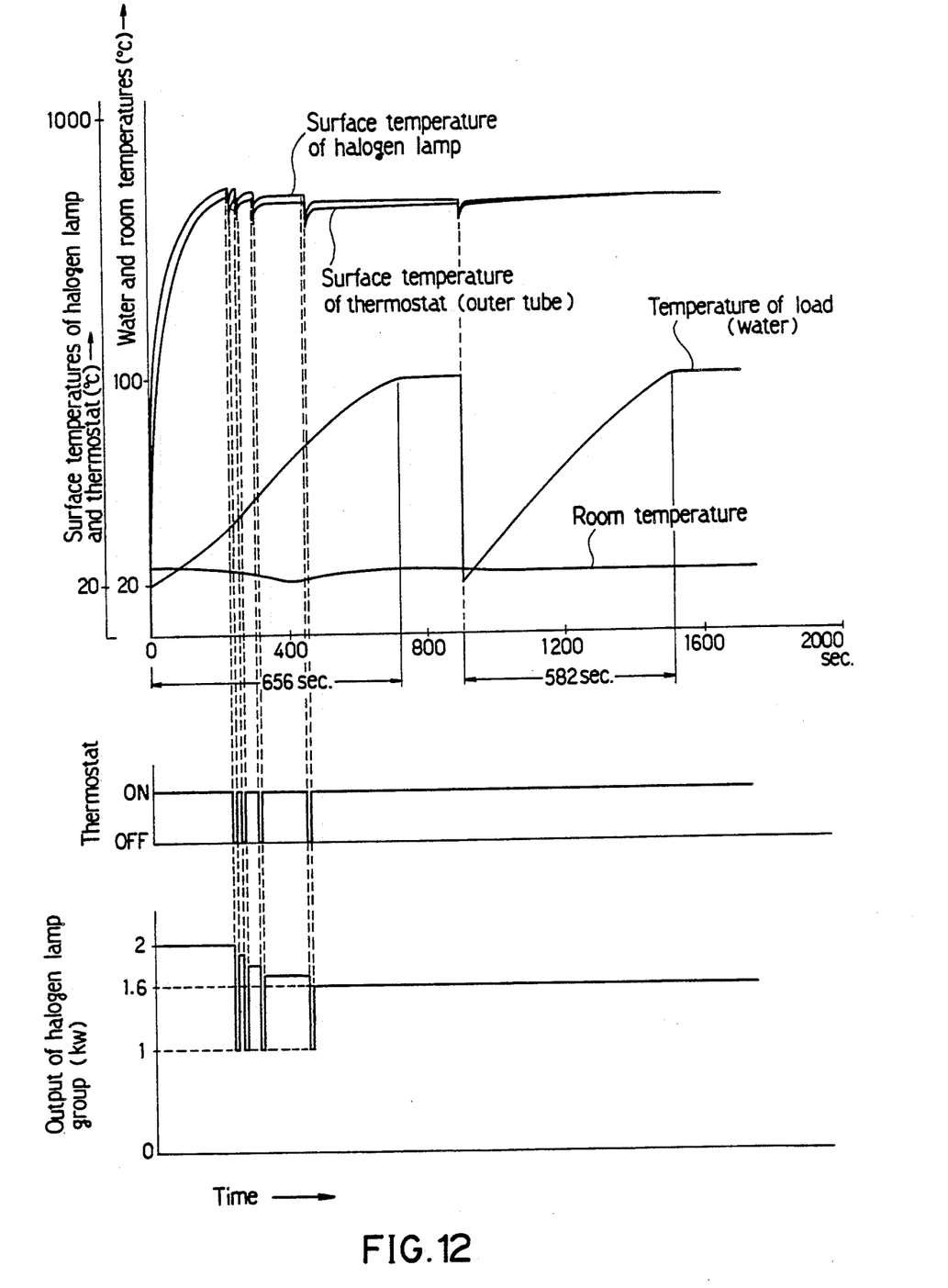
FIG. 12 is a view similar to FIG. 11 showing the case where the load being heated is replaced by a new unheated load.

According to the third embodiment, the set output of the halogen lamp group is reduced stepwise every time when the thermostat 8 is turned off but is not reduced after reaching the predetermined lower limit in the range of the cooking temperature, for example, the value of 1.6 kW. Consequently, the favorable heating characteristics may be ensured even when water is added to the pan which is being heated or when without operation of the OFF switch 13 after completion of the cooking by the use of a pan, another pan is placed on the top plate 7 for the cooking. FIG. 12 shows the case that after a pan containing 2 litters of water is heated so that the water is boiled, another pan containing 2 litters of water is heated without operation of the OFF switch 13. It takes 656 seconds to boil the water contained in the first pan but 582 seconds to boil the water contained in the second pan. Should the lower limit of the set output of the halogen lamp group not be provided, the set output is occasionally reduced to 1 kW in the case of a low heat absorptivity pan, the set output taking the value in the turn-off period of the thermostat 8. Thereafter, the set output of the halogen lamp group is maintained at the value of 1 kW even when another high heat absorptivity pan is placed on the top plate for cooking without operation of the OFF switch 13. Thus, without provision of the lower limit of the set output of the halogen lamp group, such fine heating characteristic as obtained from the electric cooking appliance of the third embodiment could not be obtained.

Although the halogen lamp group is energized with the output of 1 kW even in the period that the thermostat 8 is turned off, the halogen lamp group may be deenergized.

The foregoing disclosure and drawings are merely illustrative of the principles of the present invention and are not to be interpreted in a limiting sense. The only limitation is to be determined from the scope of the appended claims.

What we claim is:

1. An electric cooking appliance wherein a plurality of heater lamps are supported by a frame having an opening so that light is radiated from the heater lamps through the opening toward a light-transmissible top plate disposed so as to cover the opening of the frame, characterized by a protecting device comprising temperature sensing means for sensing the ambient temperature of the heater lamps or the temperature of a portion of the electric cooking appliance depending on the ambient temperature of the heater lamps, said temperature sensing means generating a state detection signal when the sensed temperature reaches a predetermined value, and output control means for controlling output of the heater lamps so that a set output of the heater lamps is reduced every time when the state detection signal generated by the temperature sensing means is supplied thereto, whereby the heating for the cooking is continued under the condition that the calorific value of the heater lamps is lowered stepwise.

2. An electric cooking appliance according to claim 1, wherein said output control means comprises a switching element turned on and off so that the heater lamps are connected to and disconnected from a power line, said switching element being turned on when the temperature sensed by the temperature sensing means reaches the predetermined value and thereafter being turned off when the temperature sensed by the temperature sensing means reaches a value corresponding to a predetermined differential with respect to the predetermined value.

3. An electric cooking appliance according to claim 2, wherein an electrical power is supplied to the heater lamps even during an OFF period of an ON-OFF operation of the switching element and the electrical power supplied to the heater lamps during the switching element OFF period takes a value smaller than that during an ON period.

4. An electric cooking appliance according to claim 1, wherein said output control means is responsive to an initial state detection signal generated by the temperature sensing means after a predetermined period from the start of the heating operation of the heater lamps.

5. An electric cooking appliance according to claim 1, wherein said output control means is responsive to an initial state detection signal generated by the temperature sensing means after the start of the heating operation of the heater lamps.

6. An electric cooking appliance according to claim 1, wherein the set output of the heater lamps is lowered stepwise in a range above a predetermined lower limit output value.

7. An electric cooking appliance of the type employing a plurality of heater lamps and including a housing for the heater lamps, temperature sensing means for sensing the ambient temperature of the interior of the housing and producing a control signal during the time that the sensed temperature exceeds a predetermined value, and output control means supplied with the control signal for shutting off power to the heater lamps after receipt of the control signal and resupplying power to the lamps after the control signal ceases, characterized in that the output control means successively supplies less and less power each time it resupplies power to the lamps.

8. An electric cooking appliance as recited in claim 7 wherein the output control means resupplies less power reduced in stepwise fashion by the same predetermined fraction of the maximum power available each time power is resupplied to the lamps.

9. An electric cooking appliance as recited in claim 7 wherein the output control means, during the heating of the lamps, never reduces the power to the lamps below a predetermined minimum level.

* * * * *